(12) United States Patent
Heckman et al.

(10) Patent No.: US 8,040,522 B1
(45) Date of Patent: Oct. 18, 2011

(54) METHOD AND ASSEMBLY FOR AN INTERFEROMETRIC FIBER OPTIC GYRO

(75) Inventors: Dwayne W. Heckman, Yorba Linda, CA (US); Ralph B. Morrow, Jr., Birmingham, AL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 377 days.

(21) Appl. No.: 12/385,452

(22) Filed: Apr. 8, 2009

(51) Int. Cl.
*G01C 19/72* (2006.01)
(52) U.S. Cl. ...................................................... 356/460
(58) Field of Classification Search .................. 356/459, 356/460, 483
See application file for complete search history.

(56) References Cited

U.S. PATENT DOCUMENTS

| | | | |
|---|---|---|---|
| 5,459,575 A | 10/1995 | Malvern | 356/350 |
| 5,608,525 A | 3/1997 | Kumagai et al. | 356/350 |
| 5,935,191 A | 8/1999 | Sakanashi et al. | 701/207 |
| 7,385,177 B2 * | 6/2008 | Steinberg et al. | 250/227.18 |

* cited by examiner

*Primary Examiner* — Michael A Lyons
(74) *Attorney, Agent, or Firm* — John Tarlano

(57) ABSTRACT

A method for determining an accurate phase difference between a phase of a light beam in each of two light paths, the two light paths being in a rotating interferometric fiber optic gyro, by measuring a first phase difference due to angular velocity of the rotating interferometric fiber optic gyro, flipping axes of rotation of photons in the light loops of the rotating interferometric fiber optic gyro, and measuring a second phase difference due to angular velocity of the rotating interferometric fiber optic gyro.

8 Claims, 5 Drawing Sheets

METHOD AND ASSEMBLY FOR AN INTERFEROMETRIC FIBER OPTIC GYRO

BACKGROUND OF THE INVENTION

A planar rotating interferometric fiber optic gyro is designed to produce an accurate phase difference, DeltaPhi(t), between a counter clock-wise light loop and a clock-wise light loop, for a gyro rotation rate OMEGA. However, a planar rotating interferometric fiber optic gyro can produce an erroneous phase difference, DeltaPhi'(t), due to temperature, mechanical effects or other environmental influences. DeltaPhi'(t) is a measured phase difference that is not the accurate phase difference, DeltaPhi(t).

DeltaPhi'(t) is a measured phase difference over time between two light loops in the rotating interferometric fiber optic gyro. DeltaPhi'(t) occurs when a fiber optic gyro is experiencing an applied rotational velocity OMEGA.

A variation between a measured phase difference, DeltaPhi'(t), and an accurate phase difference, DeltaPhi(t), is gyro phase drift. Such gyro phase drift can be due to a temperature variation in the rotating interferometric fiber optic gyro, or due to a mechanical variation in the rotating interferometric fiber optic gyro. The amount of gyro phase drift can slowly change with time.

Gyro phase drift is evidenced as a difference value DeltaPhi(t)–DeltaPhi'(t) or DeltaPhi'(t)–DeltaPhi(t) for an applied planar rotational velocity, OMEGA, of an interferometric fiber optic gyro.

An erroneous phase difference, DeltaPhi'(t), will cause a planar rotational velocity measurement, OMEGA', to be made by the interferometric fiber optic gyro.

Laser light, in each of the two light beams, has the same phase Phi(t) as the laser light enters the single optical fiber cable. The phase difference between the two exiting counter-rotating light beams is detected in the interference pattern. Ideally, an accurate phase difference, DeltaPhi(t)=(Phi1(t)–Phi2(t)), or Delta Phi(t)=(Phi2(t)–Phi1(t)), should be produced due to a counterclockwise or clockwise planar angular rotational velocity of the fiber optic gyro.

Gyro phase drift changes with time, and tends to be slowly continuous, in a mathematical sense. The present invention uses the continuity of slow gyro phase drift changes to eliminate the overall effect of gyro phase drift.

SUMMARY OF THE INVENTION

In the present interferometric fiber optic gyro assembly, a phase difference DeltaPhi'1(t), due to a measured rotational velocity of the interferometric fiber optic gyro, is first sensed, and recorded, over an interval of time T1–T0, such as 5 minutes.

The rotational axes of photons in the two light loops are rotated, that is flipped +180 degrees, by flipping the plane of the interferometric fiber optic gyro by +180 degrees. The plane is flipped from a 0 degree plane to a +180 degree plane. The flipping occurs over a very short time T2–T1.

A phase difference DeltaPhi'2(t), due to a measured planar rotational velocity of the interferometric fiber optic gyro, is again sensed, and recorded, over an interval of time T3–T2, such as 5 minutes.

The rotational axes of photon's in the two light loops are flipped +180 degrees, by flipping the plane of the fiber optic gyro by +180 degrees. The plane is flipped from an a +180 degree plane to a +360 degree plane. The flipping occurs over a very short time T4–T3.

A phase difference DeltaPhi'3(t), due to a measured rotational velocity of the fiber optic gyro, is sensed, and recorded, over an interval of time T5–T4, such as 5 minutes.

The rotational axes of photons in the two light loops are flipped –180 degrees, by flipping the plane of the fiber, optic gyro by –180 degrees. The plane is flipped from a +360 degree plane to a +180 degree plane by the –180 degree flipping. The flipping occurs over a very short time T6–T5.

A phase difference DeltaPhi'4(t), due to a measured planar rotational velocity of the fiber optic gyro, is sensed, and recorded, over an interval of time T7–T6, such as 5 minutes.

The rotational axes of photons in the two light loops are flipped –180 degrees, by flipping the plane of the fiber optic gyro by –180 degrees. The plane is flipped from a 180 degree plane to a 0 degree plane The flipping occurs over a very short time T8–T7.

A phase difference DeltaPhi'5(t), due to a measured rotational velocity of the fiber optic gyro, is sensed, and recorded, over an interval of time T9–T8, such as 5 minutes.

An accurate phase difference DeltaPhi(t), that should ideally be measured due to a planar rotational velocity OMEGA of the fiber optic gyro, that occurred during the time intervals T1–T0, T3–T2, T5–T4, T7–T6 and T9–T8, is achieved by processing the phase differences DeltaPhi'1(t), DeltaPhi'2(t), DeltaPhi'3(t), DeltaPhi'4(t) and DeltaPhi'5(t) in pairs, in other combinations or all together.

In the short term, the direction of gyro phase drift change is reversed, due to the flipping steps. Due to the gyro flipping steps, the overall effect of gyro phase drift change, over the five intervals of time T1–T0, T3–T2, T5–T4, T7–T6 and T9–T8 is greatly attenuated.

Again, by the present invention, the amount of phase difference, DeltaPhi'1(t), between the two light paths of a rotating fiber optic gyro is measured and recorded-over a first interval of time, from a time T0 until a time T1. Time T1 is a time after a starting time To. The amount of phase difference is measured when photons in the two light paths of the fiber optic gyro have a first axes of rotation, in a first direction, between time T0 and time T1.

Then, at the time T1, the direction of the axes of rotation of photons in the light loops is rotated, that is flipped 180 degrees, to an opposite direction to the direction of the first axes of rotation. There is a reversal of direction of photons in the two light paths. That is, the directions of the second axes of rotation of photons in the two light paths are opposite to the directions of the first axes of rotation.

The measured amount of phase difference, DeltaPhi'2(t), between the two light paths, of the flipped fiber optic gyro, is again sensed and recorded over a second interval of time, that is, between a time T2 and a time T3. The photons in the two light paths have directions during the time interval T3–T2 that are opposite to directions of photons during the time interval T1–T0. Time interval T3–T2 is made equal to time interval T1–T0.

The recorded measurements DeltaPhi'1(t) and DeltaPhi'2(t), over time intervals T1–T0 and T3–T2 are processes together in an algorithm, to greatly reduce the effect of drift over the two time intervals. The algorithm, (DeltaPhi'1(t)+DeltaPhi'2(t))/2=DeltaPhi(t) is used to process the measurements. The algorithm is located in a computer. An accurate phase difference, DeltaPhi(t), equals (DeltaPhi'1(t)+DeltaPhi'(t))/2. DeltaPhi(t) can be calculated use during time intervals T3–T2 and T1–T0. The calculated value, DeltaPhi(t) can be used as the phase difference for time interval T3–T0. A true rotational velocity, OMEGA, of the rotating fiber optic gyro can be determined from accurate phase difference DeltaPhi(t).

By means of such measuring, flipping and measuring steps, the effect of gyro drift can be greatly reduced out over the time intervals T3−T2 and T1−T0. The calculated phase difference DeltaPhi(t) can be used as the phase difference between time T0 and time T3. The true overall phase shift, DeltaPhi(t), from time T0 to time T3 can be accurately determined. Therefore rotational velocity OMEGA over the time interval T3−T0 can be accurately determined by the disclosed method.

By periodically flipping the axes of rotation of photons in the fiber optic gyro at regular intervals, and using a mathematical algorithm to process the measured phase differences, the overall effect of gyro drift is significantly reduced.

Further, two non-true angular velocities values, OMEGA' and OMEGA", can be determined from the two phase difference measurements, DeltaPhi'1(t) and DeltaPhi'2(t). These two non-true angular velocity values can be added together, and divided by 2, to find a true angular velocity, OMEGA, of the rotating fiber optic gyro, over the time intervals T3−T0.

Any difference in angular velocity values arrived at due to two measurement steps over the two time intervals T3−T2 and T1−T0 can be attributed to drift. The difference can be used in processing the angular velocity determined during time occurring to the two adjacent time intervals.

After an accurate phase difference, DeltaPhi(t), is determined, the amount of gyro drift, DeltaPhi'1(t)−DeltaPhi(t), from time T0 to time T1, can be determined. Further, after accurate phase difference DeltaPhi(t) is determined, the amount of gyro drift, DeltaPhi'2(t)−DeltaPhi(t), from time T2 to time T3, can also be determined.

A method for determining an accurate phase difference, DeltaPhi(t), between a phase of a light beam in each of two light paths, the two light paths being in a rotating interferometric fiber optic gyro, steps comprising measuring a first phase difference, DeltaPhi'1(t), due to angular velocity of the rotating interferometric fiber optic gyro over a time interval T1−T0, flipping axes of rotation of photons in the light loops of the rotating interferometric fiber optic gyro by 180 degrees, over a time interval T2−T1, and measuring a second phase difference, DeltaPhi'2(t), due to angular velocity of the rotating interferometric fiber optic gyro over a time interval T3−T2.

DESCRIPTION OF THE PREFERRED EMBODIMENT

Figure 1:
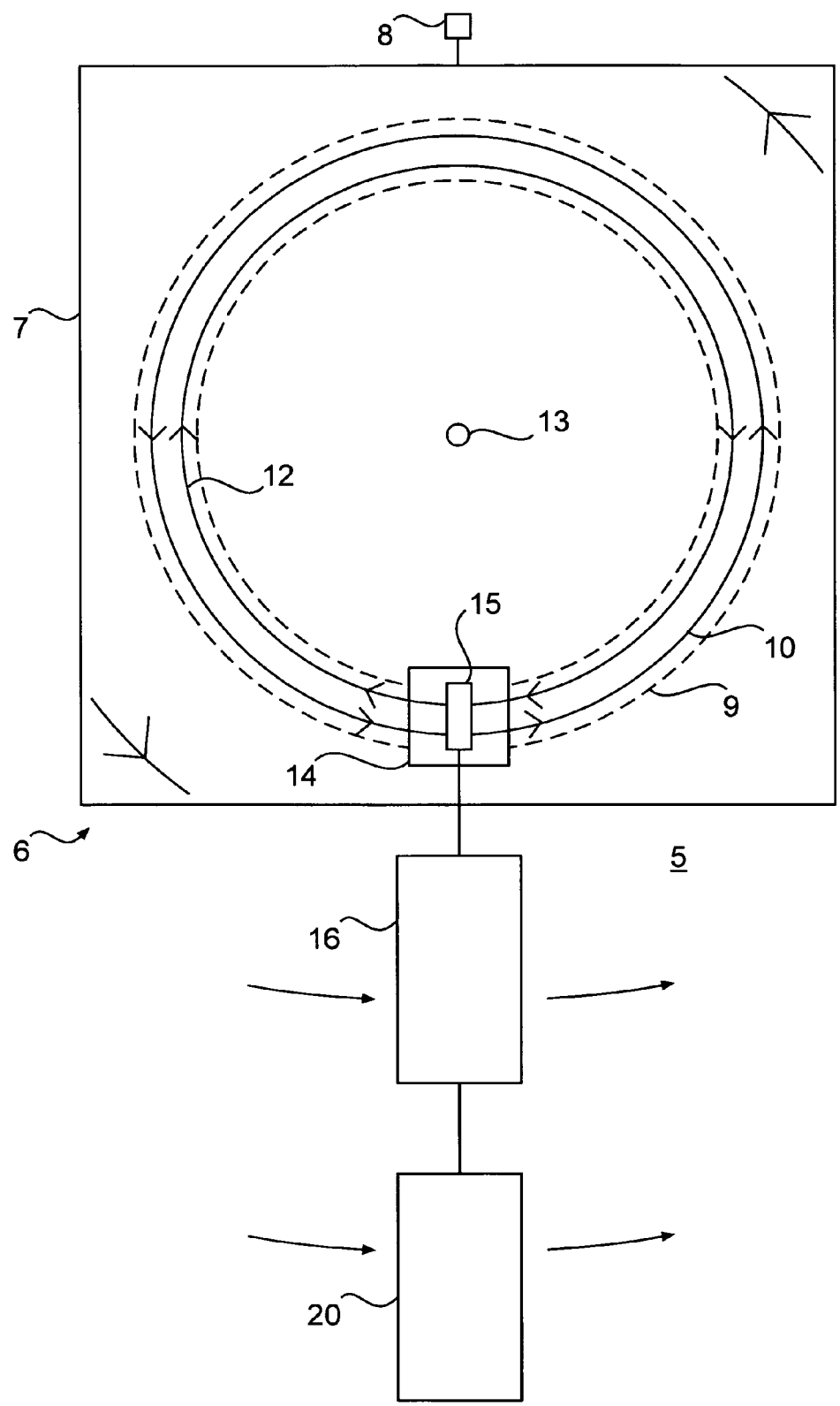
FIG. 1 is a diagram of an interferometric fiber optic gyro assembly for an interferometric fiber optic gyro, a single optical fiber coil in the interferometric fiber optic gyro, the single optical fiber coil having two light paths, the interferometric fiber optic gyro being in a first configuration.

FIG. 1 shows an interferometric fiber optic gyro assembly 5 that has a interferometric fiber optic gyro 6. A plate 7 of the interferometric fiber optic gyro 6 is shown as rotating around a center of the plate 7, in a counter-clockwise direction. The axis of rotation of plate 7 is axis 13

The plate 7 of the fiber optic gyro 6 is connected to a stepper motor 8. The interferometric fiber optic gyro 6 and stepper motor 8 are parts of the interferometric fiber optic gyro assembly 5. The stepper motor 8 can rotate the plane of the plate 7 out of the plane of FIG. 1, such as by 180 degrees out of the plane of FIG. 1.

The plate 7 of the fiber optic gyro 6 holds an interferometric fiber optic coil 9 within the plate 7. The interferometric fiber optic coil 9 contains a first light path 10. The first light path 10 holds a light beam. The first light path 10 has photons that travel in counter-clockwise direction. The optical fiber coil 9 also contains a second light path 12. The second light path 12 holds a light beam. The second light path 12 has photons that travel in a clockwise direction.

The light paths 10 and 12 are located within the single rotating interferometric fiber optic coil 9.

An axis of rotation 13 of the gyro 6, and of photons in the first light path 10 of the fiber optic gyro 9, is shown as being upward. The axis 13 is upward, out of the surface of FIG. 1, due to a right hand rule for the counter-clockwise direction of travel of photons of the first optical path 10.

A light transmitter-detector 14 is connected to the fiber optic coil 9 of fiber optic gyro 6. The transmitter-detector 14 has a beam splitting unit 15. Beam splitting unit 15 splits a single beam of laser light, generated by transmitter-detector 14, into two beams of light. The two beams of light form the first light path 10 and the second light path 12. Light transmitter-detector 14 sends the light beams into opposite directions in coil 9, forming the two light path 10 and 12 in coil 9. The beams of light of light paths 10 and 12 have the same frequency.

The beam splitting unit 15 receives light coming from each of light loop 10 and 12. Transmitter-detector 14 detects any phase difference, DeltaPhi1'(t), between the phase Phi1 of light in the first light path 10 and the phase Phi2 of light in the second light path 12. A phase difference, DeltaPhi1'(t) between the phase of the light in the first light path 10 and the phase of the light in the second light path 12, is proportional to a rate of angular rotation OMEGA of the fiber optic gyro 8. The transmitter-detector 14 produces an output of the phase difference DeltaPhi1'(t).

A recorder 16 is connected to the light transmitter-detector 14. The recorder 16 records any detected phase difference DeltaPhi1'(t).

At a time T0, in FIG. 1, the fiber optic gyro 6 is experiencing an angular rotational velocity, OMEGA, around axis 13. A phase difference DeltaPhi1'(t) is sensed, that is detected, by transmitter-detector 14, over time T1−T0. This detected phase difference information is sent to recorder 16 and recorded, over time.

During a time interval T1−T0, a detected phase difference DeltaPhi1'(t) is recorded by recorder 16. The recorder 16 contains a measurement of phase difference DeltaPhi1'(t) during time interval T1−T0. Recorder 16 is shown as connected to fiber optic gyro 6.

At time T1 gyro 6 is begun to be flipped. The gyro 8 has flipped to 180 degrees from its initial plane, at time T2.

Figure 2:
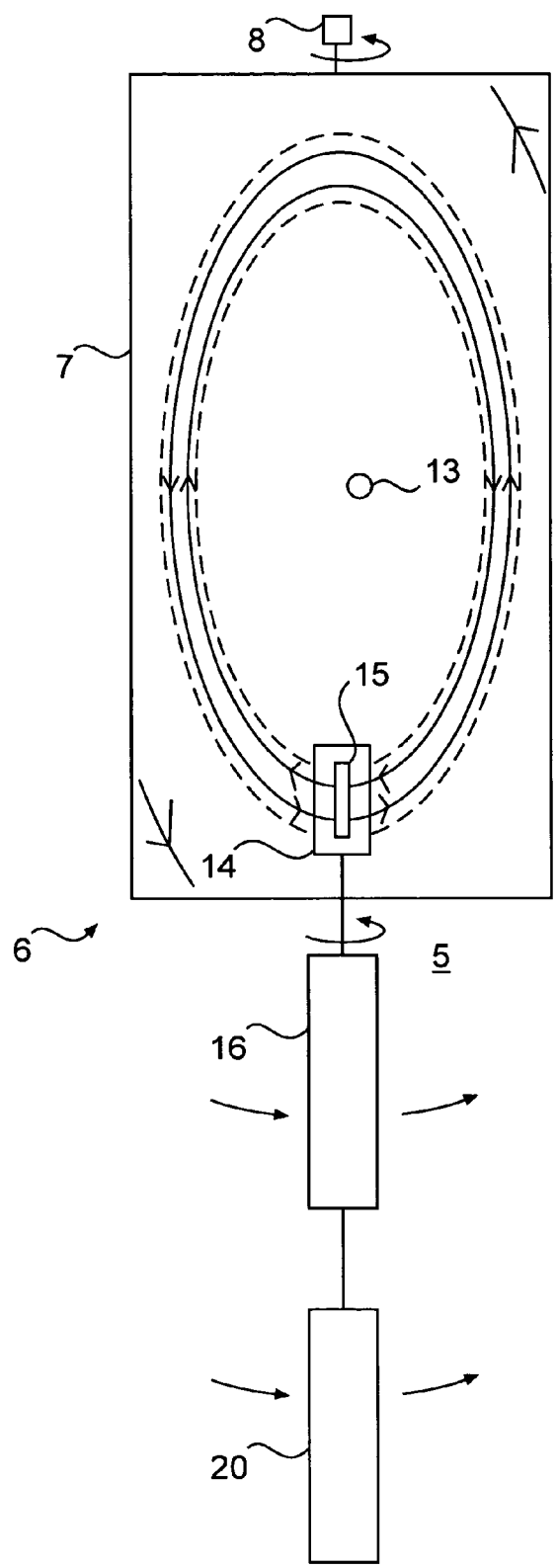
FIG. 2 is a diagram wherein the two light paths shown in FIG. 1 have been rotated, that is flipped 45 degrees into a second configuration.

In FIG. 2, the stepper motor 8 is shown as rotating the plate 7 of fiber optic gyro 6 out of the plane of FIG. 1. The axes of rotation of photons in light loops 10 and 12 of fiber optic gyro 8 are in a process of being flipped 180 degrees, and are shown as having been flipped 45 degrees by stepper motor 8, in a counter-clockwise direction.

Figure 3:
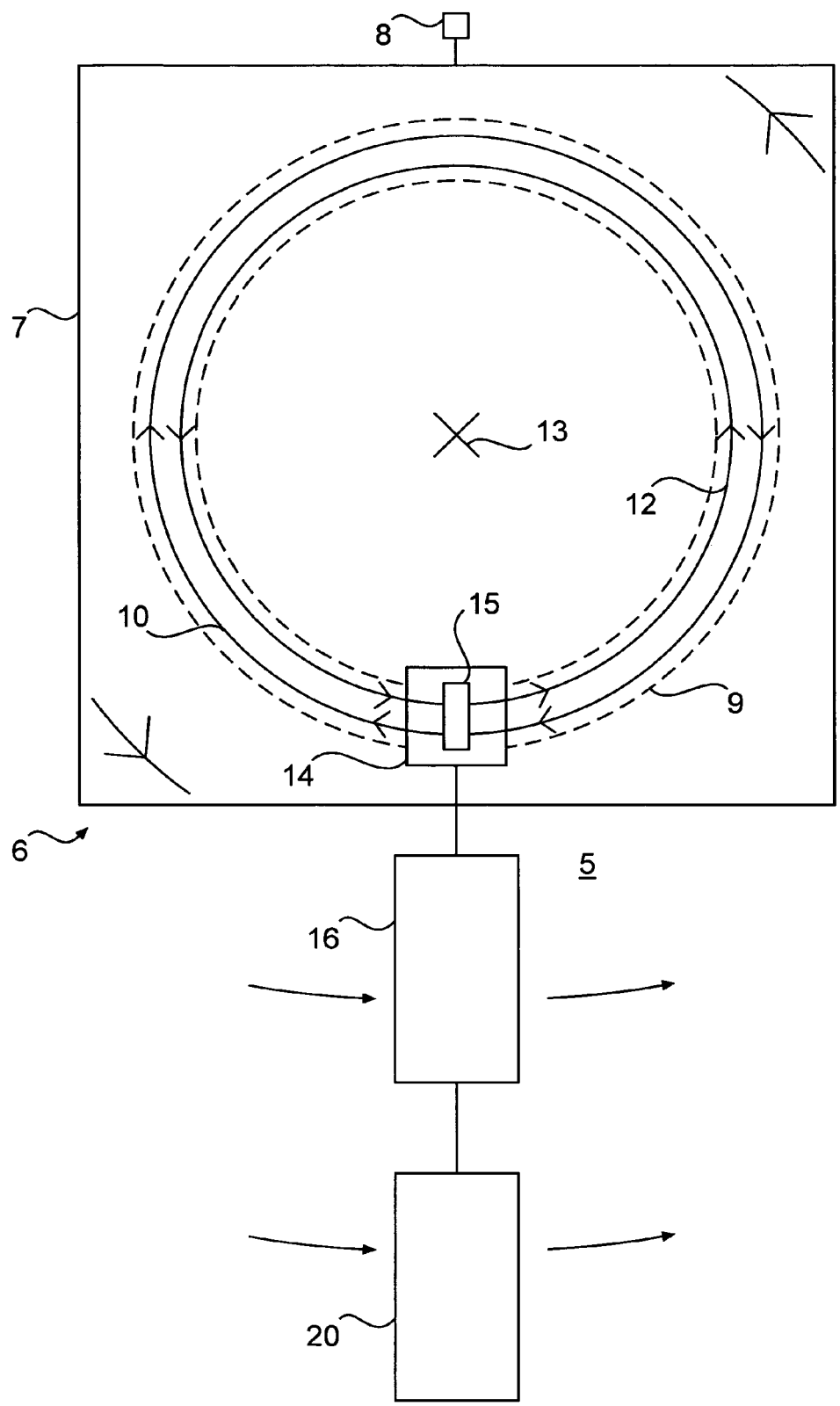
FIG. 3 is a diagram wherein the two light paths shown in FIG. 1 have been rotated, that is flipped 180 degrees into a third configuration.

In FIG. 3, the axes of rotation of photons in light paths 10 and 12 of fiber optic gyro 8 have been flipped 180 degrees during a time interval T2–T1. T2–T1 is one second in time. Now, photons in light path 12 are counter-clockwise and photons in light path 10 are clockwise. Again light paths 10 and 12 are within a single optical fiber 9 of fiber optic gyro 6. The axis of rotation 13 of photons in the light path 10 is shown as being downward, into surface of FIG. 3, the due to the use of the right hand rule for the clockwise direction of travel of light of the first optical path 10. The axis 13, shown in FIG. 3, is in the opposite direction from the axis 13, shown in FIG. 1.

At a time T2 a phase difference DeltaPhi2'(t) is begun to be sensed. DeltaPhi2'(t) is detected, by transmitter-detector 14, over time T3–T2. This detected phase difference information is sent to recorder 16 and recorded, over time interval T3–T2.

During time interval T3–T2, a detected phase difference DeltaPhi2'(t) is recorded by recorder 16. The recorder 16 holds a measurement of phase difference DeltaPhi2'(t) during time interval T3–T2.

At a time T3, phase difference DeltaPhi2'(t) of light paths 10 and 12 over a time interval T3–T2, has been detected by transmitter-detector 14 and recorded by recorder 16. The recorder 16 contains measurements of phase difference DeltaPhi2'(t) over time interval T3–T2.

The recorder 16 sends measurements of phase difference DeltaPhi1'(t) and phase difference DeltaPhi2'(t) to a computer 20. Computer 20 uses DeltaPhi1'(t) and DeltaPhi2'(t) with an algorithm, (DeltaPhi1'(t)+DeltaPhi2'(t))/2=DeltaPhi(t), to calculate DeltaPhi(t). DeltaPhi(t) is a true phase difference during time interval T1–T0 and time interval T3–T2.

A true angular rotational rate OMEGA, for the fiber optic gyro 6, can be determined from true phase difference DeltaPhi(t).

Any difference in angular velocity values arrived at due to using the two above mention phase differences DeltaPhi1'(t) and DeltaPhi2'(t) can be attributed to gyro phase drift. The phase differences can be used in processing the angular velocities determined during future time.

Further, two angular velocities, OMEGA1 and OMEGA2, arrived at by using the two phase differences DeltaPhi1'(t) and DeltaPhi2'(t), can be added together and divided by 2, to find a total angular velocity over the two time intervals. That is, OMEGA=(OMEGA1+OMEGA2)/2.

By periodically using the above described transmitting, detecting, recording, flipping, recording and processing operations, phase drift can be reduced, over an extended period of time. That is, the axes of photons in light paths 10 and 12 of fiber optic gyro 6 are flipped after a given time interval, that has a value equal to T1–T0, over extended periods of time.

Phase shifts can be more accurately determined by using the disclosure light path flipping technique. Again, using the above described flipping step between two equal intervals of time, each time interval equal to time interval T1–T0, and sending sensed phase difference values into recorder 16, for recording the two phase difference values during the two equal time intervals, true angular velocity over the two equal time intervals can be determined by computer 20.

Figure 4:
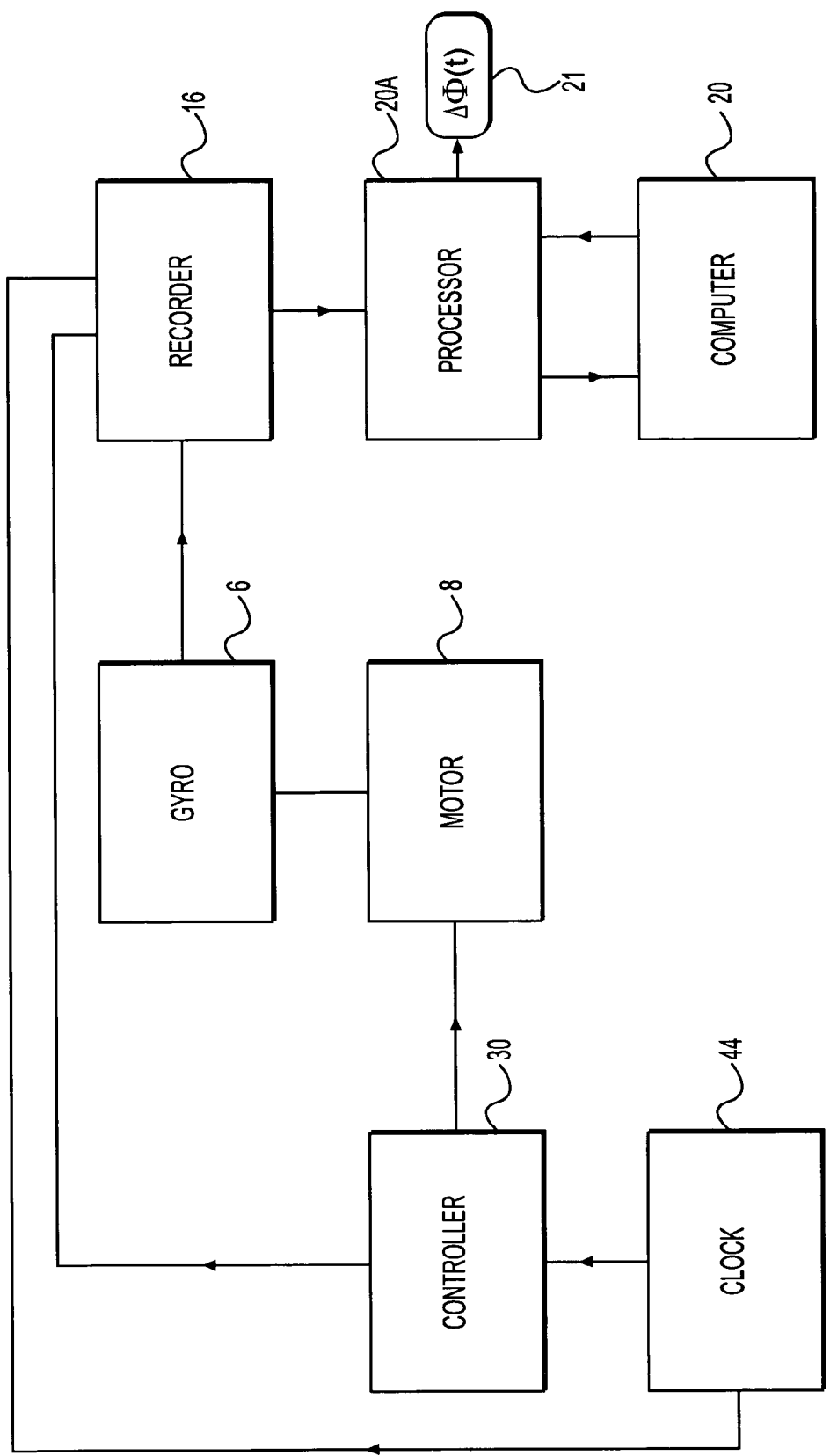
FIG. 4 is a control block diagram of an interferometric fiber optic gyro assembly of FIG. 1.

FIG. 4 shows a block diagram for controlling motor 8. A controller 30 has logic devices that implement a logic diagram of FIG. 5. Controller 30 is connected to a clock 44. Clock 44 has a timer whose time T begins at time T0. A motor 8 is connected to interferometric fiber optic gyro 6. Motor 8 flips the gyro 6. Gyro 6 is connected to recorder 16. Recorder 16 is connected to processor 20A. Processor 20A is a unit of computer 20. Clock 44 inputs a clock signal to controller 30. Processor 20A outputs an accurate phase difference DeltaPhi(t) to navigation equipment 21.

Figure 5:
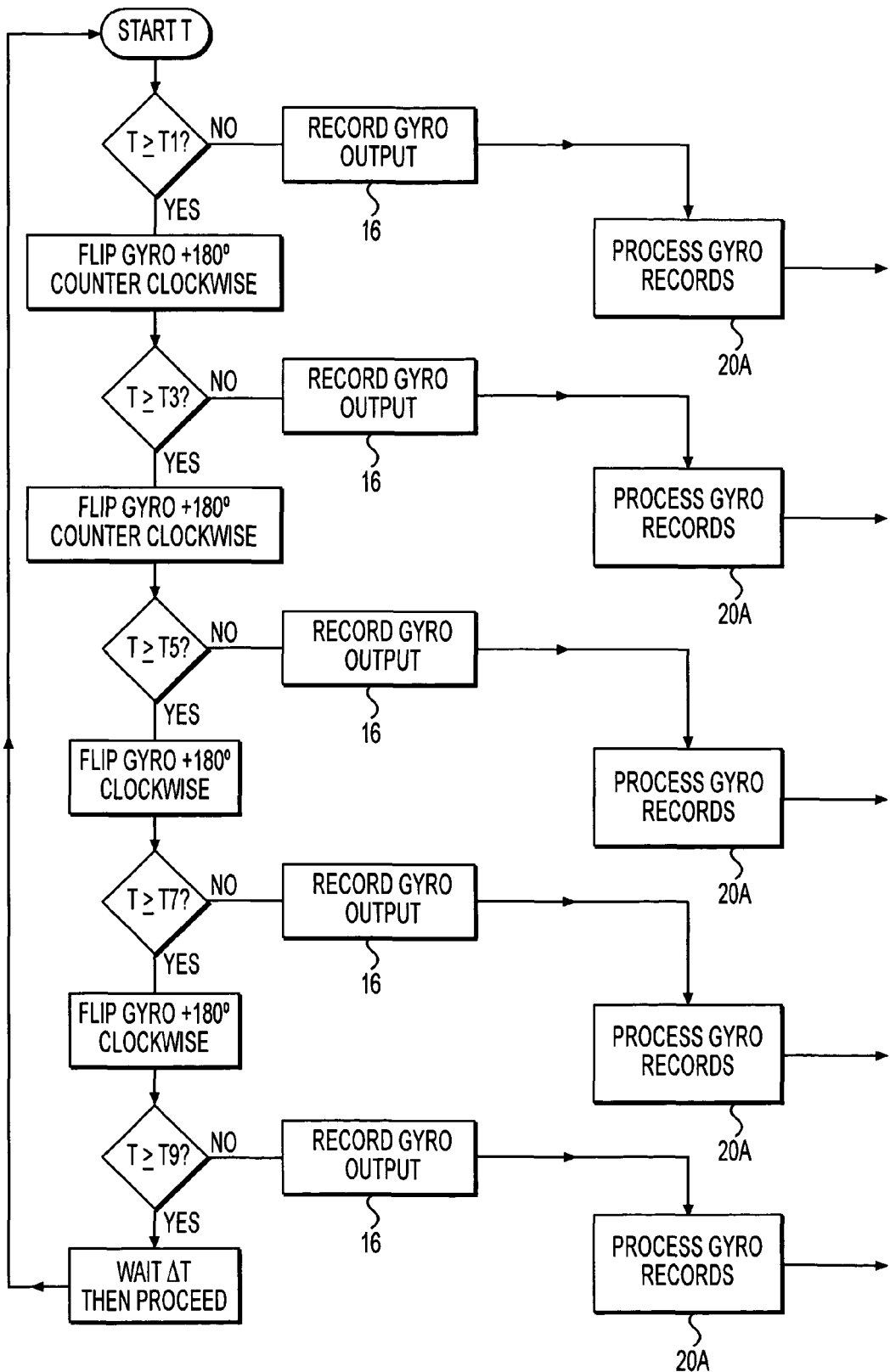
FIG. 5 is a logic diagram of control logic used by the interferometric fiber optic gyro assembly to determine gyro drift in the interferometric fiber optic gyro.

Referring to FIG. 5, when clock time T from clock 44 is greater than T1 the controller 30 sends a signal to motor 8 to flip gyro 6 by 180 degrees, in a counter-clockwise direction. If time T is less than T1 the output of interferometric fiber optic gyro 6 is recorded in recorder 16. If T is greater or equal to T1 the controller 30 sends a signal to motor 8 for motor 8 to flip gyro 6 by 180 degrees. Gyro 6 is flipped between time T1 and time T2.

If time T is less than T3, but greater than T2, recorder 16 records the output of gyro 6. When T becomes equal to or greater than T3, the controller 30 causes motor 8 to flip gyro 6 by 180 degrees in a counter-clockwise direction. Gyro 6 flips between time T3 and time T4.

If time T is less than T5, but greater than T4, recorder 16 records the output of gyro 6. When time T becomes greater than T5 the controller 30 causes the motor 8 to flip gyro 6 in a clockwise direction by 180 degrees. Gyro 6 flips between time T5 and time T6.

If time T is less than T7, but greater than T6, recorder 16 records the output of gyro 6. When time T becomes greater than T7 control 30 causes motor 8 to flip gyro 6 by 180 degrees in a clockwise direction.

Gyro 6 is flipped between time T7 and time T8. Between time T8 and time T9 recorder 16 records the output of gyro 6.

Before and after five flips, the phase difference information coming out of gyro 6 is processed by a processor 20A. The sequence shown in FIG. 5 can be repeated every hour, after waiting during a time Delta T, where Delta T equals 34 minutes and 56 seconds, to check again on the phase difference drift rate of gyro 6.

T1–T0 can be 5 minutes. T2–T1 can be 1 second. T3–T2 can be 5 minutes. T4–T3 can be 1 second. T5–T4 can be 5 minutes. T6–T5 can be 1 second. T7–T6 can be 5 minutes. T8–T7 can be 1 second. T9–T8 can be 5 minutes.

While the present invention has been disclosed in connection with the preferred embodiment thereof, it should be understood that there may be other embodiments which fall within the spirit and scope of the invention as defined by the following claims.

What is claimed is:

1. A method for measuring a first phase difference, DeltaPhi'1(t), between a phase of a light beam in each of two light paths, and a second phase difference, DeltaPhi'2(t), between a phase of a light beam in each of two light paths, the two light paths being in a rotating interferometric fiber optic gyro, steps comprising:
   (a) measuring a first phase difference, DeltaPhi'1(t), due to angular velocity of the rotating interferometric fiber optic gyro over a time interval T1–T0;
   (b) flipping axes of rotation of photons in the light paths of the rotating interferometric fiber optic gyro by 180 degrees, over a time interval T2–T1; and
   (c) measuring a second phase difference, DeltaPhi'2(t), due to angular velocity of the rotating interferometric fiber optic gyro over a time interval T3–T2.

2. A method for determining an accurate phase difference, DeltaPhi(t), between a phase of a light beam in each of two light paths, the two light paths being in a rotating interferometric fiber optic gyro, comprising:
   (a) measuring a first phase difference, DeltaPhi'1(t), due to angular velocity of the rotating interferometric fiber optic gyro over a time interval T1–T0;
   (b) flipping axes of rotation of photons in the light paths of the rotating interferometric fiber optic gyro by 180 degrees, during a time interval T2–T1;

(c) measuring a second phase difference, DeltaPhi'2(t), due to angular velocity of the rotating interferometric fiber optic gyro over a time interval T3−T2; and (d) processing the recorded first phase difference, DeltaPhi'1(t), and recorded second phase difference, DeltaPhi'2(t), with an algorithm, to determine the accurate phase difference, DeltaPhi(t).

3. The method of claim 2 wherein the algorithm is DeltaPhi'1(t)+DeltaPhi'2(t))/2=DeltaPhi(t).

4. A method for determining an accurate phase difference, DeltaPhi(t), between a phase of a light beam in each of two light paths, the two light paths being in a rotating interferometric fiber optic gyro, comprising:

(a) detecting a first phase difference, DeltaPhi'1(t), between a light beam in each of two light paths, the two light paths being in the rotating interferometric fiber optic gyro, over a time interval T1−T0;

(b) placing the first phase difference, DeltaPhi'1(t), into a recorder;

(c) recording the first phase difference DeltaPhi'1(t) in the recorder;

(d) flipping axes of the light paths of the rotating interferometric fiber optic gyro by 180 degrees during a time T2−T1;

(e) detecting a second phase difference, DeltaPhi'2(t), between a phase of a light beam in each of two light paths, the two light paths being in the rotating interferometric fiber optic gyro, over a time interval T3−T2;

(f) placing the second phase difference, DeltaPhi'2(t), into the recorder;

(g) recording the second phase difference, DeltaPhi'2(t), in the recorder; and (h) processing the recorded first phase difference, DeltaPhi'1(t), and the recorded second phase difference, DeltaPhi'2(t), with an algorithm, to determine the accurate phase difference, DeltaPhi(t).

5. The method of claim 4 wherein the algorithm is (DeltaPhi'1(t)+DeltaPhi'2(t))/2=DeltaPhi(t).

6. An interferometric fiber optic gyro assembly, comprising:

(a) an interferometric fiber optic gyro;

(b) means for flipping a pine of the interferometric fiber optic gyro by 180 degrees; and (c) means for recording a detected phase difference during a first time interval, before flipping occurs, and for recording a detected phase difference during a second time interval, equal to said first time interval, after flipping occurs.

7. An interferometric fiber optic gyro assembly, comprising:

(a) an interferometric fiber optic gyro;

(b) flipping means for flipping a plane of the interferometric fiber optic gyro by 180 degrees;

(c) a clock for sending out timing signals; and (d) a controller for receiving timing signals, the controller controlling times of flipping of the interferometric fiber optic gyro by the flipping means.

8. An interferometric fiber optic gyro assembly, comprising:

(a) an interferometric fiber optic gyro;

(b) flipping means for flipping a plane of the interferometric fiber optic gyro by 180 degrees;

(c) a clock for sending out timing signals;

(d) a controller for receiving timing signals, the controller controlling times of flipping of the interferometric fiber optic gyro by the flipping means; and (e) means for recording a detected phase difference during a first time interval, before flipping occurs, and for recording a detected phase difference during a second time interval, equal to said first time interval, after flipping occurs.

\* \* \* \* \*